(No Model.)

C. B. SELOVER.
BALING PRESS.

No. 475,002.                    Patented May 17, 1892.

WITNESSES:
H. A. Carhart
C. B. Kinne

INVENTOR.
Charles B. Selover
BY
Smith & Denison
ATTORNEYS

THE NORRIS PETERS CO., PHOTO-LITHO., WASHINGTON, D. C.

UNITED STATES PATENT OFFICE.

CHARLES B. SELOVER, OF OWASCO, NEW YORK.

BALING-PRESS.

SPECIFICATION forming part of Letters Patent No. 475,002, dated May 17, 1892.

Application filed October 3, 1891. Serial No. 407,618. (No model.)

*To all whom it may concern:*

Be it known that I, CHARLES B. SELOVER, of Owasco, in the county of Cayuga, in the State of New York, have invented new and useful Improvements in Baling-Presses, of which the following, taken in connection with the accompanying drawings, is a full, clear, and exact description.

My invention relates to baling-presses, and particularly to that class which are provided with a baling-chamber mounted upon trunnions and adapted to be rotated, so that when filled from one end it can be reversed, so as to be filled from the other end.
My object is to produce a baling-press provided with a reversible rotating baling-chamber adapted to be filled to produce a bale first from one end and then from the other, and in which when a bale is made and tied in one end the operation of packing a bale in the other end will force out the bale previously made, the inertia of the made bale aiding the packing of the new bale.

Figure 1:
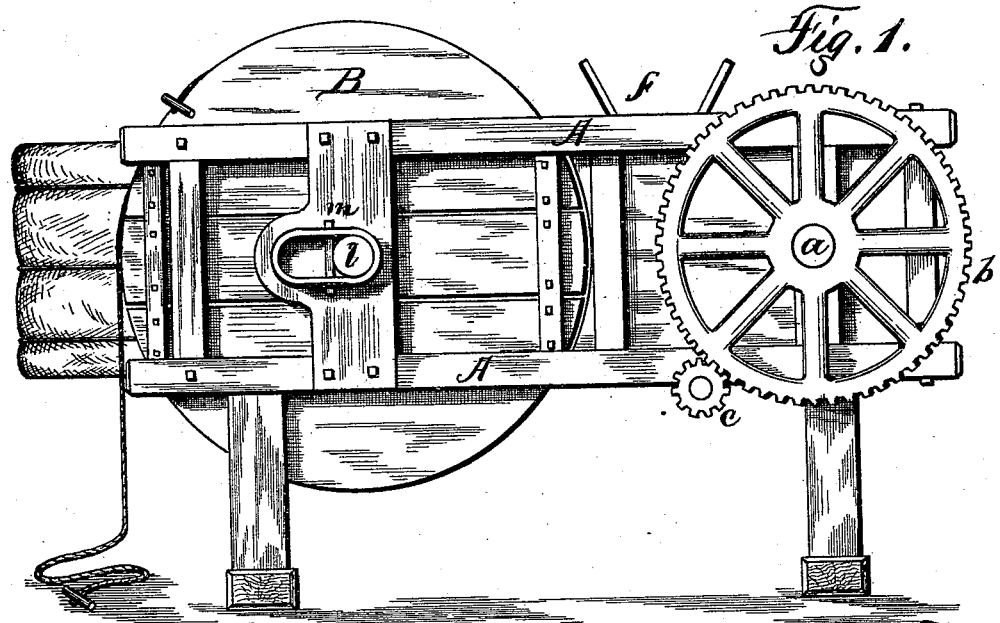
Figure 2:
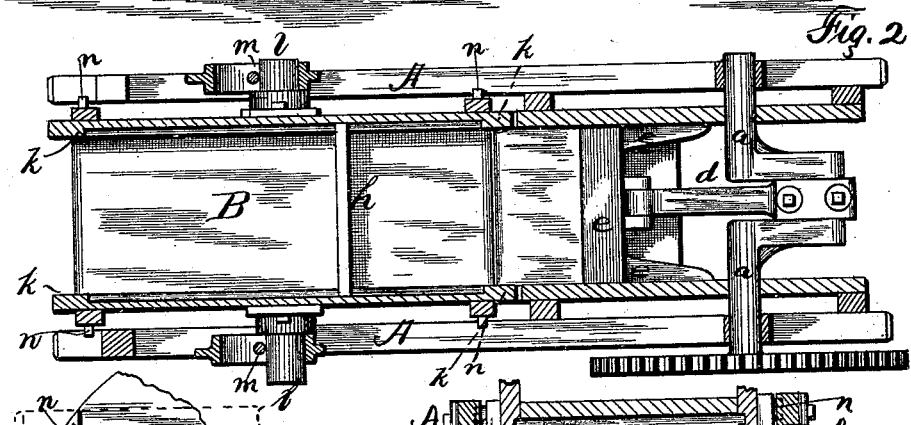
Figure 4:
Figure 3:
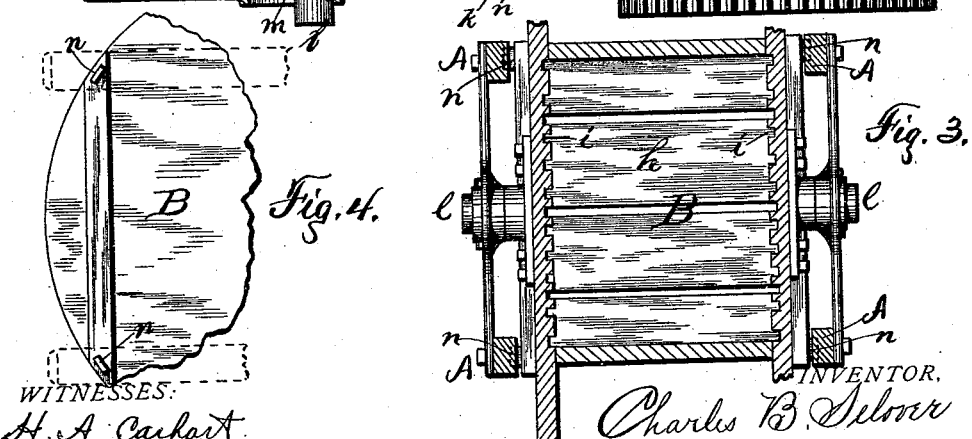

My invention consists in the several novel features of construction and operation hereinafter described, and which are specifically set forth in the claims hereunto annexed. It is constructed as follows, reference being had to the accompanying drawings, in which—
Figure 1 is a side elevation. Fig. 2 is a horizontal transverse section taken on a line through the axis of the rotating chamber and the bearings of the crank-shaft. Fig. 3 is a vertical transverse section taken upon a line either back of the bearings of the rotating chamber or in front of the traveling head in the chamber. Fig. 4 is a detail showing the guides upon the outside of the chamber.

A is the main frame, shown as supported upon legs, but which may be supported in any manner. In the front of this frame in suitable bearings I journal the crank-shaft $a$, driven by the gear $b$ and drive-pinion $c$, to which pinion the power is applied in any ordinary manner.
This crank-shaft operates the pitman-rod $d$, and this reciprocates the packing-piston $e$, to which it is connected. This piston reciprocates in the rectangular receiving-chamber formed by the vertical sides and horizontal top and bottom, and $f$ is the feeding-hopper in the top, through which the material is fed into the chamber ahead of the piston.

B is the rotating packing or baling chamber, having a diametrical rectangular opening through it, which is the baling-chamber proper, both ends of which are normally open. This chamber is provided with a traveling head $h$, provided on its vertical sides with tongues $i$, which fit and slide in horizontal grooves in the vertical walls, part at least of said grooves being provided with end stops $k$, against which the head strikes, or any other style of stop may be used. This chamber is provided with trunnions $l$, which are mounted in bearings in the main frame. These bearings are shown as elongated and perforated vertically to receive pins $m$, which pins normally hold the trunnions at one end of the bearing. Upon the outer walls of this chamber I secure the guide-lugs $n$, curved concentric with the trunnions and normally fitting loosely in grooves in the frame-timbers, so that when the chamber is rotated half-way the guides on one end will fit in the grooves at the other end.

It is operated as follows, starting with the baling-chamber empty: The operation of the piston will gradually force the traveling head to the end of the chamber, and then when the bale is made, the chamber being substantially full, I stop the piston, rotate the chamber half-way, and again start the piston. Then as the piston operates it gradually forces the head back to the other end, forcing the bale along with it, then tied, until when the head reaches the end of the chamber the made bale is forced clear out. It will be seen that the material is thus partly packed before the head thus reaches the limit of its travel, as the piston has to overcome the inertia of the weight of the made bale. The bale is tied by wires inserted before packing fully through the open grooves shown in Fig. 3, and the ends are tied after the chamber is rotated, as aforesaid, and while the bale is in the chamber. As the motion of the piston is slow, I can rotate the chamber half-way between its strokes, and in case I am not quick enough and the piston strikes the wall or end of the chamber before it has reached its proper alignment then the pins in the bearings will break, and this will be the only damage done. When the chamber is in position, the lugs or guides upon it will take the thrust of the piston.

What I claim as my invention, and desire to secure by Letters Patent, is—

1. The combination, with the chamber and the trunnions supporting it, of the elongated bearings upon the main frame and the pins through them.

2. The combination, with a baling-chamber having open ends mounted and adapted to be rotated, of a traveling head within said chamber, a piston adapted to travel within the chamber, and means for imparting a reciprocating movement to said piston, as set forth.

3. The combination, with a baling-chamber having open ends and horizontal grooves in its inner vertical walls, said chamber being mounted and adapted to be rotated, of a traveling head within said chamber provided with tongues adapted to travel in the aforesaid grooves, a piston adapted to travel in said chamber, and means for imparting a reciprocating movement to said piston, as set forth.

In witness whereof I have hereunto set my hand this 5th day of August, 1891.

CHAS. B. SELOVER.

In presence of—
HOWARD P. DENISON,
C. W. SMITH.